(12) United States Patent
Yasuda

(10) Patent No.: US 12,443,164 B2
(45) Date of Patent: Oct. 14, 2025

(54) NUMERICAL CONTROL DEVICE FOR CONTROLLING RELATIVE POSITIONAL RELATIONSHIP BETWEEN MACHINING TOOL AND WORKPIECE

(71) Applicant: Fanuc Corporation, Yamanashi (JP)

(72) Inventor: Masashi Yasuda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 332 days.

(21) Appl. No.: 18/026,440

(22) PCT Filed: Sep. 30, 2021

(86) PCT No.: PCT/JP2021/036143
§ 371 (c)(1),
(2) Date: Mar. 15, 2023

(87) PCT Pub. No.: WO2022/075178
PCT Pub. Date: Apr. 14, 2022

(65) Prior Publication Data
US 2023/0359171 A1   Nov. 9, 2023

(30) Foreign Application Priority Data

Oct. 5, 2020 (JP) .................................. 2020-168671

(51) Int. Cl.
*G05B 19/4103* (2006.01)
(52) U.S. Cl.
CPC .................... *G05B 19/4103* (2013.01); *G05B 2219/49053* (2013.01)
(58) Field of Classification Search
None
See application file for complete search history.

(56) References Cited

U.S. PATENT DOCUMENTS

2010/0138047 A1   6/2010   Bauer et al.
2015/0346707 A1*  12/2015  Haga .................... G05B 19/182
                                                700/160
(Continued)

FOREIGN PATENT DOCUMENTS

CN     110347112 A    10/2019
EP       3733328 A1   11/2020
(Continued)

OTHER PUBLICATIONS

International Search Report and Written Opinion for International Application No. PCT/JP2021/036143, dated Dec. 21, 2021, 2021, 8 pages.
(Continued)

*Primary Examiner* — Ryan A Jarrett
(74) *Attorney, Agent, or Firm* — Buchanan Ingersoll & Rooney PC

(57) ABSTRACT

A numerical control device used for a machine tool and configured to move a machining tool and a workpiece in the same direction on parallel respective drive shafts based on a machining program and control a relative positional relationship between the machining tool and the workpiece during the motion in the same direction, at least one of motion instructions for the machining tool and the workpiece being an instruction whose instruction value varies arbitrarily with time elapsed, includes: a machining program analysis unit that acquires the motion instructions for the machining tool and the workpiece from the machining program; a motion instruction generation unit that generates machining tool motion instruction data on the machining tool and workpiece motion instruction data on the workpiece based on the motion instructions; and an interpolation unit that generates machining tool interpolation data based on the machining tool motion instruction data and generates work- (Continued)

piece interpolation data based on the workpiece motion instruction data.

7 Claims, 6 Drawing Sheets

(56) References Cited

U.S. PATENT DOCUMENTS

| | | |
|---|---|---|
| 2018/0345434 A1 | 12/2018 | Nakaya et al. |
| 2019/0310602 A1 | 10/2019 | Yamamoto et al. |
| 2019/0310603 A1 | 10/2019 | Sonoda et al. |
| 2020/0319620 A1 | 10/2020 | Miyake |
| 2021/0311460 A1 | 10/2021 | Sagasaki et al. |

FOREIGN PATENT DOCUMENTS

| | | |
|---|---|---|
| JP | 3213438 U | 11/2017 |
| JP | 2019136852 A | 8/2019 |
| JP | 2019185286 A | 10/2019 |
| JP | 2020170365 A | 10/2020 |
| WO | 2017051705 A1 | 3/2017 |
| WO | 2019159533 A1 | 8/2019 |
| WO | 2020084770 A1 | 4/2020 |

OTHER PUBLICATIONS

Office Action (The First Office Action) issued Jun. 13, 2025, by the State Intellectual Property Office of People's Republic of China in corresponding Chinese Patent Application No. 202180066688.1 and an English translation of the Office Action. (14 pages).

* cited by examiner

NUMERICAL CONTROL DEVICE FOR CONTROLLING RELATIVE POSITIONAL RELATIONSHIP BETWEEN MACHINING TOOL AND WORKPIECE

CROSS REFERENCE TO RELATED APPLICATIONS

This is the U.S. National Phase application of PCT/JP2021/036143, filed Sep. 30, 2021, which claims priority to Japanese Patent Application No. 2020-168671, filed Oct. 5, 2020, the disclosures of each of these applications being incorporated herein by reference in their entireties for all purposes.

FIELD OF THE INVENTION

The present invention relates to a numerical control device for controlling a relative positional relationship between a machining tool and a workpiece.

BACKGROUND OF THE INVENTION

In typical cutting work, since a workpiece is cut in relative movement of a machining tool and the workpiece, chips of the workpiece will occur. A longer chip may damage a workpiece being processed and deteriorate the machining grade of the workpiece. Thus, cutting work may involve vibratory cutting that is to vibrate a machining tool and a workpiece relative to each other to apply air-cut and thereby cut a chip finely so that the chip does not damage the workpiece.

In the vibratory cutting, however, vibration of a machining tool or a workpiece causes repetition of reciprocating slight movement, and this causes fretting in a raceway groove or a rolling element due to oil film shortage, which may result in a shorter lifetime of a guide of a machine tool.

Thus, some machine tools and control methods have been proposed that cut off chips while avoiding fretting.

As an example of such machine tools, Patent Literature 1 discloses a lathe turning machine that includes a spindle stock provided with a spindle configured to grip a workpiece, a tool rest configured to hold a tool that cuts a workpiece, a first drive unit configured to move the spindle stock in drive directions of a predetermined orientation, a second drive unit configured to move the tool rest in the drive directions, and a control unit configured to cause the relative positional relationship between the spindle stock and the tool rest to oscillate in the drive directions during relative cutting feed of the spindle stock and the tool rest in the drive directions, and the control unit performs, alternatingly, first control to move the spindle stock and the tool rest in the positive direction of the drive directions and second control to move the spindle stock and the tool rest in the negative direction of the drive directions during the above cutting feed and causes the relative positional relationship between the spindle stock and the tool rest to oscillate in the drive directions.

According to this lathe turning machine, a chip can be divided when motion by the second control is started after the motion by the first control ends.

Further, during the first control, since the spindle stock and the tool rest are moved together in the positive direction of the drive directions, a lubricant oil spreads between a raceway groove and a rolling element in a guide used in the spindle stock and the tool rest. During the second control, since the spindle stock and the tool rest are moved together in the negative direction of the drive directions, the lubricant oil spreads between the raceway groove and the rolling element in the guide used in the spindle stock and the tool rest. Since oil film shortage is suppressed in both control operations and the relative positional relationship between the spindle stock and the tool rest is oscillated in the drive direction, it is expected that the lifetime of the guide used in cutting of workpieces can be extended.

PATENT LITERATURE

PTL 1: Japanese Patent Application Laid-Open No. 2019-136852

SUMMARY OF THE INVENTION

In the conventional machine tool described above, cutting off of a chip generated in cutting work is performed only when a reversal operation to reverse the moving direction of a machining tool and a workpiece is performed. Thus, when machining is performed at a constant feed rate, a constant load continues to be applied to a workpiece holder used for fixing and moving a workpiece and a machining tool holder used for fixing and moving the machining tool until completion of the machining. As a result, mechanical damage is continuously accumulated in the workpiece holder and the machining tool holder, and this may cause a problem of reduced machining precision or a reduced lifetime of the machine tool due to wear, damage, or the like of components.

Because of such circumstances, there is a demand for a numerical control device that can reduce a load applied to a workpiece holder and a machining tool holder during machining.

Solution to Problem

According to one aspect of the present invention, a numerical control device used for a machine tool and configured to move a machining tool and a workpiece in the same direction on parallel respective drive shafts based on a machining program and control a relative positional relationship between the machining tool and the workpiece during the motion in the same direction is provided, at least one of motion instructions for the machining tool and the workpiece is an instruction whose instruction value varies arbitrarily with time elapsed, and the numerical control device includes: a machining program analysis unit that acquires the motion instructions for the machining tool and the workpiece from the machining program; a motion instruction generation unit that generates machining tool motion instruction data on the machining tool and workpiece motion instruction data on the workpiece based on the motion instructions; and an interpolation unit that generates machining tool interpolation data based on the machining tool motion instruction data and generates workpiece interpolation data based on the workpiece motion instruction data.

According to one aspect of the present invention, a machining tool and a workpiece are moved in the same direction on parallel respective drive shafts, the relative positional relationship between the machining tool and the workpiece is changed during the motion in the same direction, and thereby a load applied to a workpiece holder and a machining tool holder during machining can be reduced.

DETAILED DESCRIPTION OF EMBODIMENTS OF THE INVENTION

Embodiments of numerical control devices that control the relative positional relationship between a machining tool and a workpiece according to a representative example of the present invention will be described below with reference to the drawings. Note that, in the present specification, an operation to move a machining tool and a workpiece "in the same direction" includes not only a case where both the machining tool and the workpiece move simultaneously but also a case where any one of the machining tool and the workpiece "stops" relative to the other. That is, it is defined that "the operation may be any operation as long as the moving direction of either the machining tool or the workpiece does not reverse".

First Embodiment

Figure 1:
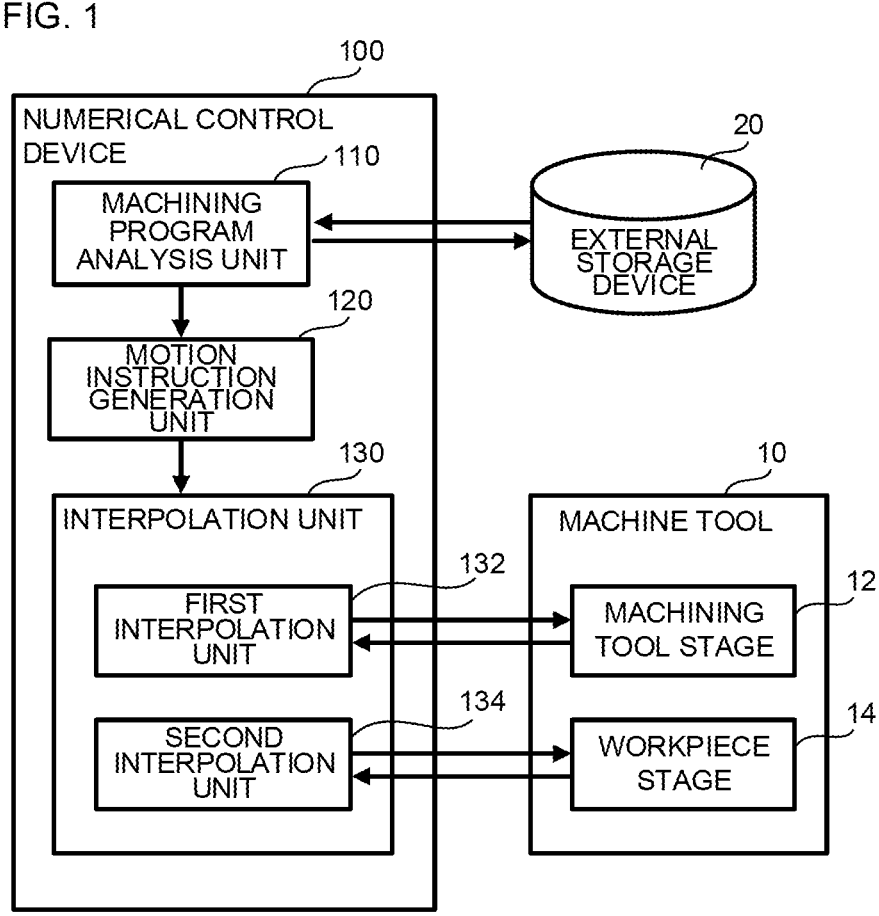
FIG. 1 is a block diagram illustrating a relation between a numerical control device and peripheral devices thereof according to a first embodiment that is a representative example of the present invention.

First, the summary of a numerical control device that controls the relative positional relationship between a machining tool and a workpiece according to a first embodiment that is a representative example of the present invention will be described below with reference to FIG. 1 to FIG. 3. FIG. 1 is a block diagram illustrating a relation between the numerical control device and peripheral devices thereof according to the first embodiment that is a representative example of the present invention. As illustrated in FIG. 1, a numerical control device 100 according to the first embodiment includes, as an example thereof, a machining program analysis unit 110 that analyzes a machining program, a motion instruction generation unit 120 that generates motion instruction data, and an interpolation unit 130 provided with a first interpolation unit 132 and a second interpolation unit 134 that generate interpolation data.

Figure 2:
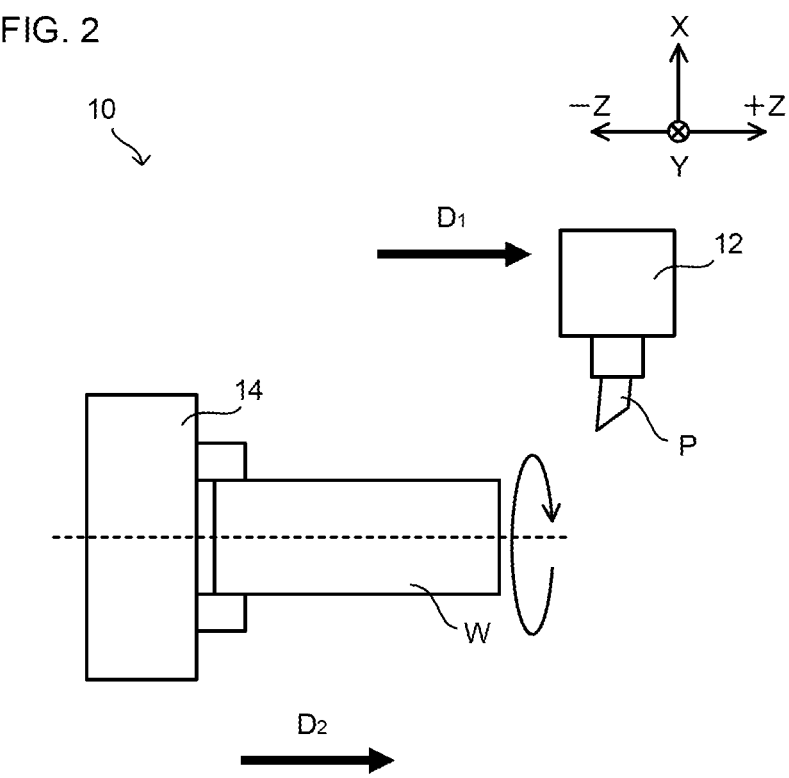
FIG. 2 is a diagram illustrating an example of moving directions on respective drive shafts of a machining tool attached to a machining tool stage and a workpiece attached to a workpiece stage in the machine tool of the first embodiment.

FIG. 2 is a diagram illustrating an example of moving directions on respective drive shafts of a machining tool attached to a machining tool stage and a workpiece attached to a workpiece stage in the machine tool of the first embodiment. As illustrated in FIG. 2, a machine tool 10 includes, as an example thereof, a machining tool stage 12 and a workpiece stage 14.

In the first embodiment that is a representative example of the present invention, the numerical control device 100 moves a machining tool P and a workpiece W in the same direction on parallel respective drive shafts based on a machining program and also changes the relative positional relationship between the machining tool P and the workpiece W during the motion in the same direction. Further, the numerical control device 100 is connected to the machine tool 10 or an external storage device 20 so as to be able to communicate with each other via a wired or communication line or the like.

The numerical control device 100 outputs various control instructions to the machine tool 10 via the interpolation unit 130. Further, the numerical control device 100 downloads a machining program describing the control operation of the machine tool 10 from the external storage device 20 and updates the machining program as needed.

In the first embodiment, the machine tool 10 may be any machine tool as long as it has the structure capable of moving a machining tool and a workpiece in parallel and may be a lathe turning machine or the like, for example. The machine tool 10 is provided with a machining tool stage 12 to which a machining tool (see reference P in FIG. 2) is attached, a workpiece stage 14 to which a workpiece (see reference W in FIG. 2) is attached, a machining tool stage drive unit (not illustrated) that drives the machining tool stage 12, a machining tool stage drive shaft (not illustrated), a workpiece stage drive unit (not illustrated) that drives the workpiece stage 14, and a workpiece stage drive shaft (not illustrated).

As illustrated FIG. 2, the machining tool P is attached to the machining tool stage 12 and moved in a machining tool moving direction D1 parallel to the +Z-axis along the machining tool stage drive shaft (not illustrated) by driving of the machining tool stage drive unit (not illustrated). Further, the workpiece W is attached to the workpiece stage 14 and moved in a workpiece moving direction D2 parallel to the +Z-axis along the workpiece stage drive shaft (not illustrated) by driving of the workpiece stage drive unit (not illustrated).

Herein, the machining tool stage drive shaft (not illustrated) of the machining tool stage 12 and the workpiece stage drive shaft (not illustrated) of the workpiece W have a positional relationship of parallel motion, and the machining tool moving direction D1 and the workpiece moving direction D2 are the same direction. Further, a machining tool holder (not illustrated) for fixing and moving the machining tool P includes the machining tool stage 12, the machining tool stage drive unit, and the machining tool stage drive shaft. Furthermore, a workpiece holder (not illustrated) for fixing and moving the workpiece W includes the workpiece stage 14, the workpiece stage drive unit, and the workpiece stage drive shaft.

The machining program analysis unit 110 acquires motion instructions for the machining tool P and the workpiece W from the machining program. Herein, the motion instructions for the machining tool P and the workpiece W are defined as instructions, at least one of which is an instruction whose instruction value arbitrarily varies with time elapsed. Note that, in the first embodiment, a case where a steady instruction whose instruction value is constant for time elapsed and a variable instruction whose instruction value varies with time elapsed are superimposed on each other will be described as an example of the motion instruction described above.

Further, the machining program analysis unit 110 includes a function of loading a block of a machining program from the external storage device 20 and analyzing the block to determine what control instruction is included in the machining program and a function of temporarily storing and saving the loaded block of the machining program. Further, the machining program analysis unit 110 acquires motion instructions of the machining tool P and the workpiece W (that is, steady instructions and variable instructions) from a control instruction of the determined machining program.

Herein, the machining program may be a program to specify a relative steady instruction and a relative variable instruction for the machining tool P and the workpiece W in addition to the case of directly specifying steady instructions and variable instructions for the machining tool P and the workpiece W. At this time, there is a relationship that "a relative steady instruction of the machining tool P and the workpiece W" is equal to a difference between "a steady instruction for a machining tool" and "a steady instruction for a workpiece". Similarly, a relationship that "a relative variable instruction of the machining tool P and the workpiece W" is equal to a difference between "a variable instruction for a machining tool" and "a variable instruction for a workpiece" is established.

The motion instruction generation unit 120 generates machining tool motion instruction data for the machining tool P and workpiece motion instruction data for the workpiece W based on the steady instructions and the variable instructions for the machining tool P and the workpiece W acquired by the machining program analysis unit 110.

The interpolation unit 130 generates machining tool interpolation data based on the machining tool motion instruction data generated by the motion instruction generation unit 120 and generates workpiece interpolation data based on the workpiece motion instruction data generated by the motion instruction generation unit 120. As one example thereof, in the first interpolation unit 132, machining tool interpolation data, which are obtained by applying interpolation calculation at interpolation cycles (control cycles) to points on an instructed path of the machining tool P attached to the machining tool stage 12 instructed from the machining tool motion instruction data, are generated based on the machining tool motion instruction data generated by the motion instruction generation unit 120. Further, in the second interpolation unit 134, workpiece interpolation data, which are obtained by applying interpolation calculation at interpolation cycles (control cycles) to points on an instructed path of the workpiece W attached to the workpiece stage 14 instructed from the workpiece motion instruction data, are generated based on the workpiece motion instruction data generated by the motion instruction generation unit 120.

Figure 3:
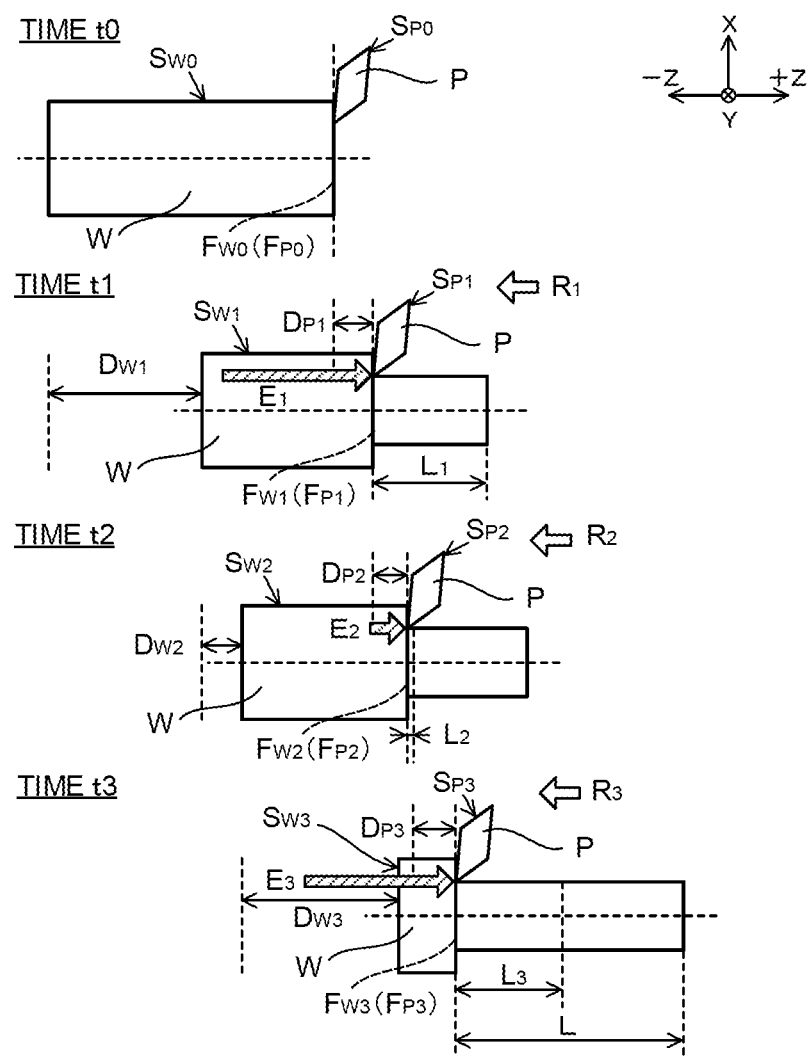
FIG. 3 is a schematic diagram illustrating an example of the operation from start of machining to end of the machining caused by control in the numerical control device of the first embodiment.

FIG. 3 is a schematic side view illustrating, in a time-series manner, an example of control of a relative positional relationship between a machining tool and a workpiece according to the numerical control device of the first embodiment. Herein, a case where diameter reduction machining, which changes the apparent feed rate of the machining tool P during machining by a length of L relative to the workpiece W, is performed from time t0 to time t3, which is equally divided into equal intervals, will be illustrated as an example as a representative cutting work to control a relative positional relationship between a machining tool and a workpiece. In this case, the workpiece W is attached to the workpiece stage 14 (not illustrated) so as to rotate about an axis parallel to the Z-axis as a rotation axis.

In the operation illustrated in FIG. 3, in the numerical control device 100, a machining program describing the control operation of the machine tool 10, which includes an instruction to change the feed rate during machining, is downloaded from the external storage device 20. In the machining program analysis unit 110, steady instructions and variable instructions are then determined from the above machining program downloaded by the numerical control device 100.

Subsequently, in the motion instruction generation unit 120, machining tool motion instruction data for the machining tool P and workpiece motion instruction data for the workpiece W are generated based on the steady instructions and the variable instructions acquired by the machining program analysis unit 110. The above machining tool motion instruction data and the above workpiece motion instruction data include instructions to move the machining tool stage 12 to which the machining tool P is attached and the workpiece stage 14 to which the workpiece W is attached in the same direction on parallel respective drive shafts and change the apparent feed rate of the machining tool P relative to the workpiece W during the motion in the same direction.

In the first interpolation unit 132 of the interpolation unit 130, machining tool interpolation data is generated based on the machining tool motion instruction data on the machining tool P generated by the motion instruction generation unit 120. Further, in the second interpolation unit 134 of the interpolation unit 130, workpiece interpolation data is generated based on the workpiece motion instruction data on the workpiece W generated by the motion instruction generation unit 120.

The machining tool interpolation data generated by the first interpolation unit 132 is transmitted from the first interpolation unit 132 to the machine tool 10. The machining tool interpolation data transmitted to the machine tool 10 is used for drive control of the machining tool stage drive unit (not illustrated). The machining tool stage 12 (not illustrated) to which the machining tool P is attached is then driven in the machining tool stage drive unit (not illustrated).

On the other hand, the workpiece interpolation data generated by the second interpolation unit 134 is transmitted from the second interpolation unit 134 to the machine tool 10. The workpiece interpolation data transmitted to the machine tool 10 is used for drive control of the workpiece stage drive unit (not illustrated). The workpiece stage 14 (not illustrated) to which the workpiece W is attached is then driven in the workpiece stage drive unit (not illustrated).

Next, the state of the machining tool P and the workpiece W will be described at each time from time t0 to t3 with reference to FIG. 3. Each of machining tool positions $S_{P0}$ to $S_{P3}$ represents the position of the machining tool P at each time. Each of workpiece positions $S_{W0}$ to $S_{W3}$ represents the position of the workpiece W at each time. Each of machining tool moving distances $D_{P1}$ to $D_{P3}$ represents a distance that the machining tool P has moved from the previous time on or after time t1. Each of workpiece moving distances $D_{W1}$ to $D_{W3}$ represents a distance that the workpiece W has moved from the previous time on or after time t1.

Each of machining tool projection faces $F_{P0}$ to $F_{P3}$ represents a surface on which the tip of the machining edge (not illustrated) of the machining tool P is positioned at each time and which is perpendicular to the rotation axis of the workpiece W. Each of workpiece projection faces $F_{W0}$ to $F_{W3}$ represents a surface which is exposed facing the machining edge (not illustrated) of the machining tool P at each time and which is perpendicular to the rotation axis of the workpiece W.

Herein, since all the machining tool projection faces $F_{P0}$ to $F_{P3}$ and the workpiece projection faces $F_{W0}$ to $F_{W3}$ are surfaces perpendicular to the rotation axis of the workpiece W, all the machining tool projection faces $F_{P0}$ to $F_{P3}$ and the workpiece projection faces $F_{W0}$ to $F_{W3}$ are surfaces parallel to each other. Further, apparent cutting feed is performed on the workpiece W by the machining tool P, and thereby each of reaction force $E_1$ to $E_3$ from the workpiece projection faces $F_{W0}$ to $F_{W3}$ of the workpiece W acts on the machining tool projection faces $F_{P1}$ to $F_{W3}$ of the machining tool P.

In the state at time t0 in FIG. 3, the machining tool P is positioned at the machining tool position $S_{P0}$. On the other hand, the workpiece W is positioned at the workpiece position $S_{W0}$. Further, the machining tool projection face $F_{P0}$ of the machining tool P and the workpiece projection face $F_{W0}$ of the workpiece W match, and the distance therebetween is zero. As a result, the machining tool P and the workpiece W are in contact with each other.

In a state at time t1 in FIG. 3, the machining tool P is positioned at the machining tool position $S_{P1}$ after moved by the machining tool moving distance $D_{P1}$. On the other hand, the workpiece W is positioned at the workpiece position $S_{W1}$ after moved by the workpiece moving distance $D_{W1}$.

At this time, the machining tool moving distance $D_{P1}$ and the workpiece moving distance $D_{W1}$ have a relationship of $D_{W1} > D_{P1}$. Further, the machining tool projection face $F_{P1}$ of the machining tool P and the workpiece projection face $F_{W1}$ of the workpiece W match, and the distance therebetween is zero. As a result, the machining tool P and the workpiece W are in contact with each other in a cut-in state.

Herein, at time t1, the workpiece W is in a state where apparent cutting feed of length $L_1$ has been performed thereon by the machining tool P. Further, length $L_1$ is the difference between the machining tool moving distance $D_{P1}$ and the workpiece moving distance $D_{W1}$, and a relationship of $L_1 = D_{W1} - D_{P1}$ is met.

In a state at time t2 in FIG. 3, the machining tool P is positioned at the machining tool position $S_{P2}$ after moved by the machining tool moving distance $D_{P2}$. On the other hand, the workpiece W is positioned at the workpiece position $S_{W2}$ after moved by the workpiece moving distance $D_{W2}$.

At this time, the machining tool moving distance $D_{P2}$ and the workpiece moving distance $D_{W2}$ have a relationship of $D_{W2} > D_{P2}$. Further, the machining tool projection face $F_{P2}$ of the machining tool P and the workpiece projection face $F_{W2}$ of the workpiece W match, and the distance therebetween is zero. As a result, the machining tool P and the workpiece W are in contact with each other in a cut-in state.

Herein, at time t2, the workpiece W is in a state where apparent cutting feed of length $L_2$ has been performed thereon by the machining tool P. Further, length $L_2$ is the difference between the machining tool moving distance $D_{P2}$ and the workpiece moving distance $D_{W2}$, and a relationship of $L_2 = D_{W2} - D_{P2}$ is met. Further, length $L_2$ and length $L_1$ of the apparent cutting feed performed at time t1 have a relationship of $L_1 > L_2$.

In a state at time t3 in FIG. 3, the machining tool P is positioned at the machining tool position $S_{P3}$ after moved by the machining tool moving distance $D_{P3}$. On the other hand, the workpiece W is positioned at the workpiece position $S_{W3}$ after moved by the workpiece moving distance $D_{W3}$.

At this time, the machining tool moving distance $D_{P3}$ and the workpiece moving distance $D_{W3}$ have a relationship of $D_{W3} > D_{P3}$. Further, the machining tool projection face $F_{P3}$ of the machining tool P and the workpiece projection face $F_{W3}$ of the workpiece W match, and the distance therebetween is zero. As a result, the machining tool P and the workpiece W are in contact with each other in a cut-in state.

Herein, at time t3, the workpiece W is in a state where apparent cutting feed of length $L_3$ has been performed thereon by the machining tool P. Further, length $L_3$ is the difference between the machining tool moving distance $D_{P3}$ and the workpiece moving distance $D_{W3}$, and a relationship of $L_3 = D_{W3} - D_{P3}$ is met.

On the other hand, length L, length $L_1$, length $L_2$, and length $L_3$ have a relationship of $L = L_1 + L_2 + L_3$. Further, length $L_3$ and length $L_2$ of the apparent cutting feed performed at time t2 have a relationship of $L_3 > L_2$.

Next, the operation of the machining tool P and the workpiece W at time t0 and each period in time t0 to time t3 controlled by the numerical control device 100 will be described with reference to FIG. 3.

At time t0, the machining tool P is moved to the machining tool position $S_{P0}$ by the machining tool motion instruction data from the numerical control device 100. Further, the workpiece W is moved to the workpiece position $S_{W0}$ by the workpiece motion instruction data from the numerical control device 100. At this time, the workpiece W may already be in rotating state at a time before time t0, or rotation may be started from time t0 when the machining tool projection face $F_{P0}$ of the machining tool P and the workpiece projection face $F_{W0}$ of the workpiece W match.

From time t0 to time t1, the machining tool P is moved from the machining tool position $S_{P0}$ to the machining tool position $S_{P1}$ by the machining tool moving distance $D_{P1}$ in a direction along the +Z-axis by the machining tool motion instruction data from the numerical control device 100. Further, the workpiece W is moved from the workpiece position $S_{W0}$ to the workpiece position $S_{W1}$ by the workpiece moving distance $D_{W1}$ in a direction along the +Z-axis by the workpiece motion instruction data from the numerical control device 100.

Herein, since the machining tool moving distance $D_{P1}$ and workpiece moving distance $D_{W1}$ have the relationship of $D_{W1} > D_{P1}$, a relative moving direction $R_1$ of the machining tool P relative to the workpiece W is a direction along the −Z-axis. Accordingly, apparent cutting feed of length $L_1$ is performed on the workpiece W by the machining tool P.

From time t1 to time t2, the machining tool P is moved from the machining tool position $S_{P1}$ to the machining tool position $S_{P2}$ by the machining tool moving distance $D_{P2}$ in a direction along the +Z-axis by the machining tool motion instruction data from the numerical control device 100. Further, the workpiece W is moved from the workpiece position $S_{W1}$ to the workpiece position $S_{W2}$ by the workpiece moving distance $D_{W2}$ in a direction along the +Z-axis by the workpiece motion instruction data from the numerical control device 100.

Herein, since the machining tool moving distance $D_{P2}$ and the workpiece moving distance $D_{W2}$ have the relationship of $D_{W2} > D_{P2}$, a relative moving direction $R_2$ of the machining tool P relative to the workpiece W is a direction along the −Z-axis. Accordingly, apparent cutting feed of length $L_2$ is performed on the workpiece W by the machining tool P.

From time t2 to time t3, the machining tool P is moved from the machining tool position $S_{P2}$ to the machining tool position $S_{P3}$ by the machining tool moving distance $D_{P3}$ in a direction along the +Z-axis by the machining tool motion instruction data from the numerical control device 100. Further, the workpiece W is moved from the workpiece position $S_{W2}$ to the workpiece position $S_{W3}$ by the workpiece moving distance $D_{W3}$ in a direction along the +Z-axis by the workpiece motion instruction data from the numerical control device 100.

Herein, since the machining tool moving distance $D_{P4}$ and the workpiece moving distance $D_{W4}$ have the relationship of $D_{W4} > D_{P4}$, a relative moving direction $R_4$ of the machining tool P relative to the workpiece W is a direction along the −Z-axis. Accordingly, apparent cutting feed of length $L_3$ is performed on the workpiece W by the machining tool P. Further, the apparent cutting feed of length $L_3$ is performed in addition to length $L_1$ and length $L_2$, and thereby the diameter reduction machining of length L relative to the workpiece W is completed.

Next, the reaction force $E_1$ to $E_3$ occurring at each time of time t0 to time t3 due to the operation of the machining tool P and the workpiece W controlled by the numerical control device 100 will be described with reference to FIG. 3.

From time t0 to time t1, the relative moving direction of the machining tool P relative to the workpiece W is a direction along the −Z-axis, and the apparent cutting feed of length $L_1$ by the machining tool P is performed on the workpiece W. Thus, during the apparent cutting feed of length $L_1$ being performed, the reaction force $E_1$ from the workpiece projection face $F_{W1}$ of the workpiece W acts on the machining tool projection face $F_{P1}$ of the machining tool P.

From time t1 to time t2, the relative moving direction of the machining tool P relative to the workpiece W is a direction along the −Z-axis, and the apparent cutting feed of length $L_2$ by the machining tool P is performed on the workpiece W. Thus, during the apparent cutting feed of length $L_2$ being performed, the reaction force $E_2$ from the workpiece projection face $F_{W2}$ of the workpiece W acts on the machining tool projection face $F_{P2}$ of the machining tool P.

From time t2 to time t3, the relative moving direction of the machining tool P relative to the workpiece W is a direction along the −Z-axis, and the apparent cutting feed of length $L_3$ by the machining tool P is performed on the workpiece W. Thus, during the apparent cutting feed of length $L_3$ being performed, the reaction force $E_3$ from the workpiece projection face $F_{W3}$ of the workpiece W acts on the machining tool projection face $F_{P3}$ of the machining tool P.

In the cutting work according to the present embodiment, an increase in the cutting feed length of a machining tool relative to a workpiece for a predetermined period results in an increase in a load applied to the workpiece from the machining tool during machining, and therefore, this cutting feed length and this load have a proportional relationship. Further, reaction force from a workpiece acting on a machining tool occurs in accordance with the weight of the load described above. Thus, the cutting feed length described above of a machining tool relative to a workpiece for a predetermined period and the reaction force described above acting on the machining tool from the workpiece during machining have a proportional relationship.

Accordingly, length $L_1$ for the apparent cutting feed performed by the machining tool P on the workpiece W from time t0 to time t1 and length $L_2$ for the apparent cutting feed performed by the machining tool P on the workpiece W from time t1 to time t2 have a relationship of $L_1 > L_2$, and therefore, the reaction force $E_1$ from the workpiece projection face $F_{W1}$ acting on the machining tool projection face $F_{P1}$ from time t0 to time t1 and the reaction force $E_2$ from the workpiece projection face $F_{W2}$ acting on the machining tool projection face $F_{P2}$ from time t1 to time t2 have a relationship of $E_1 > E_2$.

Further, length $L_2$ for the apparent cutting feed performed by the machining tool P on the workpiece W from time t1 to time t2 and length $L_3$ for the apparent cutting feed performed by the machining tool P on the workpiece W from time t2 to time t3 have a relationship of $L_3 > L_2$, and therefore, the reaction force $E_2$ from the workpiece projection face $F_{W2}$ acting on the machining tool projection face $F_{P2}$ from time t1 to time t2 and the reaction force $E_3$ from the workpiece projection face $F_{W3}$ acting on the machining tool projection face $F_{P3}$ from time t2 to time t3 have a relationship of $E_3 > E_2$.

That is, the reaction force $E_2$ from the workpiece projection face $F_{W2}$ acting on the machining tool projection face $F_{P2}$ from time t1 to time t2 is smaller than the reaction force $E_1$ from the workpiece projection face $F_{W1}$ acting on the machining tool projection face $F_{P1}$ from time t0 to time t1 and is smaller than the reaction force $E_3$ from the workpiece projection face $F_{W3}$ acting on the machining tool projection face $F_{P3}$ from time t2 to time t3. Thus, in the apparent cutting feed of length $L_2$ performed on the workpiece W by the machining tool P, the load applied to the workpiece holder used for fixing and moving the workpiece W and the machining tool holder used for fixing and moving the machining tool P can be reduced more in the period from time t1 to time t2 than in the previous period from time t0 to time t1 and the subsequent period from time t2 to time t3.

As described above, in the numerical control device according to the first embodiment of the present invention, by moving a machining tool and a workpiece in the same direction on parallel respective drive shafts and creating motion instructions for the machining tool and the workpiece as the superimposed steady instruction and variable instruction, it is possible to change the relative positional relationship between the machining tool and the workpiece during the motion in the same direction. Thus, the load applied to the workpiece holder and the machining tool holder during machining can be temporarily reduced.

Further, in the numerical control device according to the first embodiment of the present invention, since the moving direction of a machining tool and the moving direction of a workpiece during machining are always the same, it is possible to perform cutting work while causing a lubricant oil to spread into the raceway groove or the rolling element. It is thus possible to prevent fretting due to oil shortage.

Further, since a series of machining does not include any reversal operation such as simulated vibration, it is possible to avoid frequent impulsive force applied to the drive unit. Furthermore, since no reversal operation is included and thereby motion mechanisms for a machining tool and a workpiece are not affected by a backlash, a reduction in positioning precision can be prevented. Note that, although respective moving distances of the machining tool P and the workpiece W are used to perform the control of the relative positional relationship between the machining tool P and the workpiece W in the first embodiment, the velocity or the acceleration of the machining tool P and the workpiece W may be used to perform the control.

Note that, although the control of the relative positional relationship between the machining tool P and the workpiece W is performed once in the first embodiment, multiple times of the control may be performed. This can reduce the load applied to the workpiece holder and the machining tool holder during machining even when the length of cutting feed is long or the like.

Further, generation of the machining tool interpolation data and the workpiece interpolation data is not limited to be performed by the first interpolation unit 132 and the second interpolation unit 134, respectively, but may be performed together by the interpolation unit 130. Furthermore, although the case where both the motion instructions for the machining tool P and the workpiece W have variable instructions has been illustrated as an example in the above first embodiment, any one of the motion instructions may have only the steady instruction (that is, the variable instruction may be zero).

Second Embodiment

Next, the summary of a numerical control device that controls the relative positional relationship between a machining tool and a workpiece according to a second embodiment of the present invention will be described with reference to FIG. 4. Note that, in the numerical control device according to the second embodiment, each element that may employ a feature that is the same as or common to that of the first embodiment is labeled with the same reference, and the duplicated description thereof will be omitted.

In the numerical control device that controls the relative positional relationship between a machining tool and a workpiece according to the second embodiment, control to perform an operation such that the machining tool and the workpiece are separated from each other is performed at least once during motion of the machining tool and the workpiece in the same direction.

Figure 4:
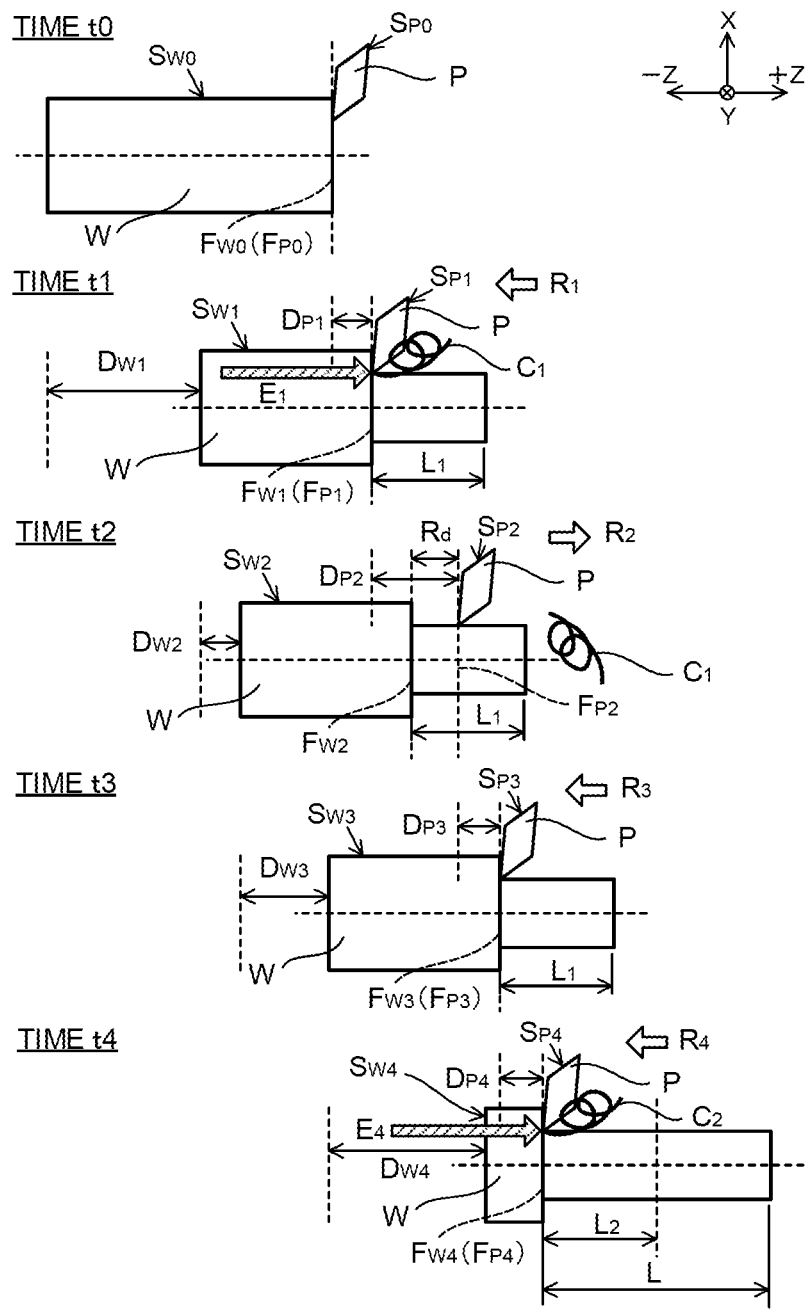
FIG. 4 is a schematic diagram illustrating an example of the operation from start of machining to end of the machining caused by control in a numerical control device of a second embodiment.

FIG. 4 is a schematic side view illustrating, in a time-series manner, an example of cutting off a chip in accordance with control to perform an operation such that the machining tool and the workpiece are once separated from each other during motion of the machining tool and the workpiece in the same direction according to the numerical control device of the second embodiment. Herein, a case where diameter reduction machining of length L is performed on the workpiece W from time t0 to time t4 as representative cutting work of the second embodiment will be illustrated as an example. Further, the operation in which the machining tool P and the workpiece W are separated from each other is performed after apparent cutting feed of length $L_1$ is performed on the workpiece W.

In the operation illustrated in FIG. 4, in the numerical control device 100, a machining program describing a control operation of the machine tool 10, which includes an instruction to perform a chip cutting-off operation once during machining, is downloaded from the external storage device 20. In the machining program analysis unit 110, steady instructions and variable instructions are then acquired from the machining program including an instruction to once perform vibratory cutting.

Subsequently, in the motion instruction generation unit 120, machining tool motion instruction data on the machining tool P and workpiece motion instruction data on the workpiece W are generated based on the steady instructions and the variable instructions acquired by the machining program analysis unit 110. These machining tool motion instruction data and workpiece motion instruction data include the instruction to move the machining tool stage 12 to which the machining tool P is attached and the workpiece stage 14 to which the workpiece W is attached in the same direction on parallel respective drive shafts and once perform an operation such that the machining tool P and the workpiece W are separated from each other during the motion in the same direction.

Next, the state of the machining tool P and the workpiece W at each time from time t0 to t4 will be described with reference to FIG. 4. Each of machining tool positions $S_{P0}$ to $S_{P4}$ represents the position of the machining tool P at each time. Each of workpiece positions $S_{W0}$ to $S_{W4}$ represents the position of the workpiece W at each time. Each of machining tool moving distances $D_{P1}$ to $D_{P4}$ represents a distance that the machining tool P has moved from the previous time on or after time t1. Each of workpiece moving distances $D_{W1}$ to $D_{W4}$ represents a distance that the workpiece W has moved from the previous time on or after time t1.

Each of machining tool projection faces $F_{P0}$ to $F_{P4}$ represents a surface on which the tip of the machining edge (not illustrated) of the machining tool P is positioned at each time and which is perpendicular to the rotation axis of the workpiece W. Each of workpiece projection faces $F_{W0}$ to $F_{W4}$ represents a surface which is exposed facing the machining edge (not illustrated) of the machining tool P at each time and which is perpendicular to the rotation axis of the workpiece W. Further, since all the machining tool projection faces $F_{P0}$ to $F_{P4}$ and the workpiece projection faces $F_{W0}$ to $F_{W4}$ are surfaces perpendicular to the rotation axis of the workpiece W, all the machining tool projection faces $F_{P0}$ to $F_{P4}$ and the workpiece projection faces $F_{W0}$ to $F_{W4}$ are parallel to each other.

In the state at time t0 in FIG. 4, the machining tool P is positioned at the machining tool position $S_{P0}$. On the other hand, the workpiece W is positioned at the workpiece position $S_{W0}$. Further, the machining tool projection face $F_{P0}$ of the machining tool P and the workpiece projection face $F_{W0}$ of the workpiece W match, and the distance therebetween is zero. As a result, the machining tool P and the workpiece W are in contact with each other.

In a state at time t1 in FIG. 4, the machining tool P is positioned at the machining tool position $S_{P1}$ after moved by the machining tool moving distance $D_{P1}$. On the other hand, the workpiece W is positioned at the workpiece position $S_{W1}$ after moved by the workpiece moving distance $D_{W1}$.

At this time, the machining tool moving distance $D_{P1}$ and the workpiece moving distance $D_{W1}$ have a relationship of $D_{W1} > D_{P1}$. Further, the machining tool projection face $F_{P1}$ of the machining tool P and the workpiece projection face $F_{W1}$ of the workpiece W match, and the distance therebetween is zero. As a result, the machining tool P and the workpiece W are in contact with each other in a cut-in state.

Herein, at time t1, the workpiece W is in a state where apparent cutting feed of length $L_1$ has been performed thereon by the machining tool P. Further, length $L_1$ is the difference between the machining tool moving distance $D_{P1}$ and the workpiece moving distance $D_{W1}$, and a relationship of $L_1 = D_{W1} - D_{P1}$ is met.

In a state at time t2 in FIG. 4, the machining tool P is positioned at the machining tool position $S_{P2}$ after moved by the machining tool moving distance $D_{P2}$. On the other hand, the workpiece W is positioned at the workpiece position $S_{W2}$ after moved by the workpiece moving distance $D_{W2}$.

At this time, the machining tool moving distance $D_{P2}$ and the workpiece moving distance $D_{W2}$ have a relationship of $D_{W2} < D_{P2}$. Accordingly, the machining tool P has moved ahead of the workpiece W, and the machining tool projection face $F_{P2}$ of the machining tool P and the workpiece projection face $F_{W2}$ of the workpiece W have a positional relationship of being distant by a relative distance $R_d$. Further, the relative distance $R_d$ is a difference between the machining tool moving distance $D_{P2}$ and the workpiece moving distance $D_{W2}$, and a relationship of $R_d=D_{P2}-D_{W2}$ is met.

In a state at time t3 in FIG. 4, the machining tool P is positioned at the machining tool position $S_{P3}$ after moved by the machining tool moving distance $D_{P3}$. On the other hand, the workpiece W is positioned at the workpiece position $S_{W3}$ after moved by the workpiece moving distance $D_{W3}$.

At this time, the machining tool moving distance $D_{P3}$ and the workpiece moving distance $D_{W3}$ have a relationship of $D_{W3}>D_{P3}$ and $D_{P3}-D_{W3}=R_d$. Accordingly, the machining tool projection face $F_{P3}$ of the machining tool P and the workpiece projection face $F_{W3}$ of the workpiece W match, and the distance therebetween is zero. As a result, the machining tool P and the workpiece W are in contact with each other without the machining tool P cutting in the workpiece W.

In a state at time t4 in FIG. 4, the machining tool P is positioned at the machining tool position $S_{P4}$ after moved by the machining tool moving distance $D_{P4}$. On the other hand, the workpiece W is positioned at the workpiece position $S_{W4}$ after moved by the workpiece moving distance $D_{W4}$.

At this time, the machining tool moving distance $D_{P4}$ and the workpiece moving distance $D_{W4}$ have a relationship of $D_{W4}>D_{P4}$. Further, the machining tool projection face $F_{P4}$ of the machining tool P and the workpiece projection face $F_{W4}$ of the workpiece W match, and the distance therebetween is zero. As a result, the machining tool P and the workpiece W are in contact with each other in a cut-in state.

Herein, at time t4, the workpiece W is in a state where apparent cutting feed of length $L_2$ has been performed thereon by the machining tool P. Further, length $L_2$ is the difference between the machining tool moving distance $D_{P4}$ and the workpiece moving distance $D_{W4}$, and a relationship of $L_2=D_{W4}-D_{P4}$ is met. Further, length L, length $L_1$, and length $L_2$ have a relationship of $L=L_1+L_2$.

Next, the operation of the machining tool P and the workpiece W at time t0 and each period in time t0 to time t4 controlled by the numerical control device 100 will be described with reference to FIG. 4.

At time t0, the machining tool P is moved to the machining tool position $S_{P0}$ by the machining tool motion instruction data from the numerical control device 100. Further, the workpiece W is moved to the workpiece position $S_{W0}$ by the workpiece motion instruction data from the numerical control device 100. At this time, the workpiece W may already be in rotating state at a time before time t0, or rotation may be started from time t0 when the machining tool projection face $F_{P0}$ of the machining tool P and the workpiece projection face $F_{W0}$ of the workpiece W match.

From time t0 to time t1, the machining tool P is moved from the machining tool position $S_{P0}$ to the machining tool position $S_{P1}$ by the machining tool moving distance $D_{P1}$ in a direction along the +Z-axis by the machining tool motion instruction data from the numerical control device 100. Further, the workpiece W is moved from the workpiece position $S_{W0}$ to the workpiece position $S_{W1}$ by the workpiece moving distance $D_{W1}$ in a direction along the +Z-axis by the workpiece motion instruction data from the numerical control device 100.

Herein, since the machining tool moving distance $D_{P1}$ and the workpiece moving distance $D_{W1}$ have the relationship of $D_{W1}>D_{P1}$, the relative moving direction $R_1$ of the machining tool P relative to the workpiece W is a direction along the −Z-axis, and apparent cutting feed of length $L_1$ is performed on the workpiece W by the machining tool P. Further, because the apparent cutting feed is performed, a cut chip $C_1$ occurs from the workpiece projection face $F_{W1}$ of the workpiece W.

From time t1 to time t2, the machining tool P is moved from the machining tool position $S_{P1}$ to the machining tool position $S_{P2}$ by the machining tool moving distance $D_{P2}$ in a direction along the +Z-axis by the machining tool motion instruction data from the numerical control device 100. Further, the workpiece W is moved from the workpiece position $S_{W1}$ to the workpiece position $S_{W2}$ by the workpiece moving distance $D_{W2}$ in a direction along the +Z-axis by the workpiece motion instruction data from the numerical control device 100.

Herein, since the machining tool moving distance $D_{P2}$ and the workpiece moving distance $D_{W2}$ have the relationship of $D_{W2}<D_{P2}$, the relative moving direction $R_2$ of the machining tool P relative to the workpiece W is a direction along the +Z-axis, and feed in an apparently separating direction by the relative distance $R_d$ from the workpiece W is performed at the machining tool P. Further, since feed in the apparently separating direction is performed and thereby the machining tool P is not in contact with the workpiece W, the workpiece holder for fixing and moving the workpiece W and the machining tool holder for fixing and moving the machining tool P are in an unloaded state, and the chip $C_1$ is cut off from the workpiece projection face $F_{W2}$ of the workpiece W.

From time t2 to time t3, the machining tool P is moved from the machining tool position $S_{P2}$ to the machining tool position $S_{P2}$ by the machining tool moving distance $D_{P3}$ in a direction along the +Z-axis by the machining tool motion instruction data from the numerical control device 100. Further, the workpiece W is moved from the workpiece position $S_{W2}$ to the workpiece position $S_{W3}$ by the workpiece moving distance $D_{W3}$ in a direction along the +Z-axis by the workpiece motion instruction data from the numerical control device 100.

Herein, since the machining tool moving distance $D_{P3}$ and the workpiece moving distance $D_{W3}$ have the relationship of $D_{W3}>D_{P3}$, a relative moving direction $R_3$ of the machining tool P relative to the workpiece W is a direction along the −Z-axis, and apparent approaching feed by the relative distance $R_d$ is performed on the workpiece W by the machining tool P up to a position at which the machining tool projection face $F_{P3}$ and the workpiece projection face $F_{W3}$ match. Further, because the apparent approaching feed is performed, the machining tool P is in contact with the workpiece W without cutting therein.

From time t3 to time t4, the machining tool P is moved from the machining tool position $S_{P3}$ to the machining tool position $S_{P4}$ by the machining tool moving distance $D_{P4}$ in a direction along the +Z-axis by the machining tool motion instruction data from the numerical control device 100. Further, the workpiece W is moved from the workpiece position $S_{W3}$ to the workpiece position $S_{W4}$ by the workpiece moving distance $D_{W4}$ in a direction along the +Z-axis by the workpiece motion instruction data from the numerical control device 100.

Herein, since the machining tool moving distance $D_{P4}$ and the workpiece moving distance $D_{W4}$ have the relationship of $D_{W4}>D_{P4}$, a relative moving direction $R_4$ of the machining tool P relative to the workpiece W is a direction along the −Z-axis, and apparent cutting feed of length $L_2$ is performed on the workpiece W by the machining tool P. Apparent cutting feed of length $L_2$ is then performed in addition to length $L_1$, and thereby the diameter reduction machining of length L performed on the workpiece W is completed.

After the completion of the diameter reduction machining of length L performed on the workpiece W, the machining tool P is moved in the direction along the +Z-axis, and the machining tool P is separated from the workpiece W. Accordingly, a chip $C_2$ occurring from the workpiece projection face $F_{W4}$ of the workpiece W is cut off by the apparent cutting feed of length $L_2$.

Next, the reaction force $E_1$ occurring from time t0 to time t1 and the reaction force $E_4$ occurring from time t3 to time t4 due to the operation of the machining tool P and the workpiece W controlled by the numerical control device 100 will be described with reference to FIG. 4.

From time t0 to time t1, the relative moving direction of the machining tool P relative to the workpiece W is a direction along the −Z-axis, and the apparent cutting feed of length $L_1$ by the machining tool P is performed on the workpiece W. Thus, during the apparent cutting feed of length $L_1$ being performed, the reaction force $E_1$ from the workpiece projection face $F_{W1}$ of the workpiece W acts on the machining tool projection face $F_{P1}$ of the machining tool P.

From time t1 to time t2, the relative moving direction of the machining tool P relative to the workpiece W is a direction along the +Z-axis, and apparent separating feed is performed on the workpiece W by the machining tool P. Thus, relative motion of the machining tool P to the workpiece W is performed from a position at which the workpiece projection face $F_{W1}$ of the workpiece W matches the machining tool projection face $F_{P1}$ of the machining tool P to a position at which the machining tool projection face $F_{P2}$ of the machining tool P is distant by the apparent relative distance $R_d$ from the workpiece projection face $F_{W2}$ of the workpiece W. Therefore, in the period from time t1 to time t2, no reaction force acting on the machining tool projection face $F_{P2}$ of the machining tool P from the workpiece projection face $F_{W2}$ of the workpiece W occurs.

From time t2 to time t3, the relative moving direction of the machining tool P relative to the workpiece W is a direction along the −Z-axis. During this period, apparent approaching feed is performed on the workpiece W by the machining tool P from a position at which the machining tool projection face $F_{P2}$ of the machining tool P is distant by the relative distance $R_d$ from the workpiece projection face $F_{W2}$ of the workpiece W, which is indicated by time t2, to a position at which the machining tool projection face $F_{P3}$ of the machining tool P matches the workpiece projection face $F_{W3}$ of the workpiece W, which is indicated by time t3. Therefore, since no cutting is performed on the workpiece W by the machining tool P in this section, no load (reaction force) from the machining tool P is applied to the workpiece W.

From time t3 to time t4, the relative moving direction of the machining tool P to the workpiece W is a direction along the −Z-axis, and the apparent cutting feed of length $L_2$ is performed on the workpiece W by the machining tool P. Thus, during the apparent cutting feed of length $L_2$ being performed, the reaction force $E_4$ from the workpiece projection face $F_{W4}$ of the workpiece W acts on the machining tool projection face $F_{P4}$ of the machining tool P.

Since the motion of the machining tool P ($D_{P1}$ to $D_{P4}$) and the motion of the workpiece W ($D_{W1}$ to $D_{W4}$) in the period from time t0 to time t4 are always in the same direction, the workpiece holder for fixing and moving the workpiece W and the machining tool holder for fixing and moving the machining tool P can be in an unloaded state, respectively, during the period from time t1 to time t3, and the chip $C_1$ can be cut off without requiring vibratory cutting to be performed.

In such a way, machining control of moving the machining tool P and the workpiece W in the same direction on parallel respective drive shafts and once performing an operation such that the machining tool P and the workpiece W are separated from each other during the motion in the same direction is performed based on a machining program by the numerical control device 100.

As described above, in the numerical control device according to the second embodiment of the present invention, the instruction values of motion instructions for a machining tool and a workpiece are suitably adjusted to perform an operation such that the machining tool and the workpiece are temporarily separated from each other, and thereby the loads applied to the workpiece holder and the machining tool holder during the machining can be temporarily made zero, which is achieved in addition to the advantageous effects obtained in the first embodiment. Further, a chip can be cut off during the machining tool and the workpiece being moved in the same direction on parallel respective drive shafts.

Note that, although control of the relative positional relationship between a machining tool and a workpiece is performed once in the second embodiment, multiple times of the control may be performed. Accordingly, even in machining that would cause a longer chip length for one stroke, it is possible to cut off the chip for multiple times and thus more reliably prevent the chip from damaging the workpiece.

Further, although the case where both the motion instructions for the machining tool P and the workpiece W have variable instructions has been illustrated as an example also in the second embodiment in the same manner as the case of the first embodiment, any one of the motion instructions may have only the steady instruction (that is, the variable instruction may be zero).

Third Embodiment

Next, the summary of a numerical control device that controls the relative positional relationship between a machining tool and a workpiece according to a third embodiment of the present invention will be described with reference to FIG. 5 to FIG. 7. Note that, in the numerical control device according to the third embodiment, each element that may employ a feature that is the same as or common to that of the first and second embodiments is labeled with the same reference, and the duplicated description thereof will be omitted.

In the numerical control device that controls the relative positional relationship between a machining tool and a workpiece according the third embodiment, the variable instructions in motion instruction data for a machining tool and a workpiece during cutting work are of such a manner that can be expressed by a constant periodical oscillation waveform, and respective oscillation cycles of the oscillation waveforms for the machining tool and the workpiece are the same, as an example thereof. Further, although the instruction values for the machining tool and the workpiece represent respective moving distances of a machining tool and a workpiece in the first and second embodiments, a case where the instruction values represent velocities will be illustrated as an example in the present embodiment. Further, in the present embodiment, since the instruction values represent moving velocities of a machining tool and a workpiece as an example thereof, it is possible to control the relative positional relationship between the machining tool and the workpiece by using a moving velocity difference between the machining tool and the workpiece.

In this case, the motion instructions for a machining tool and a workpiece are the superimposed steady instruction and variable instruction, as described above. Thus, when the machining tool and the workpiece are moved in the same direction, a relative velocity difference between the machining tool and the workpiece will also be smaller when the phases of both the motion instructions are the same (that is, the phase difference is zero). Therefore, to change the relative positional relationship between a machining tool and a workpiece to a large degree, it is preferable to provide a phase difference between respective variable instructions in motion instructions for the machining tool and the workpiece. Accordingly, in the specific examples in FIG. 5 and FIG. 6, a case where the phase difference of oscillation waveforms representing variable instructions for a machining tool and a workpiece is 180 degrees is illustrated as an example.

Figure 5:
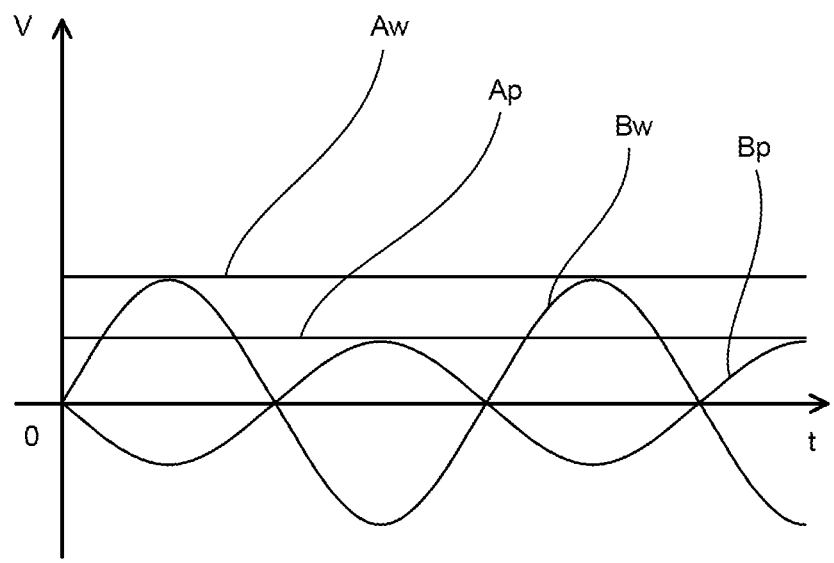
FIG. 5 is a graph illustrating an example of temporal changes in moving velocities that are instruction values in respective steady instruction components and variable instruction components generated by a numerical control device of a third embodiment and used for motion of a workpiece and a machining tool.

FIG. 5 is a graph illustrating an example of temporal changes of respective steady instruction components and variable instruction components used for motion of a workpiece and a machining tool generated by the numerical control device of the third embodiment. In FIG. 5, the horizontal axis represents time (t), and the vertical axis represents velocity (V). FIG. 5 illustrates a machining tool steady instruction component $A_P$ and a machining tool variable instruction component $B_P$ for the machining tool P and a workpiece steady instruction component $A_W$ and a workpiece variable instruction component $B_W$ for the workpiece W.

Figure 6:
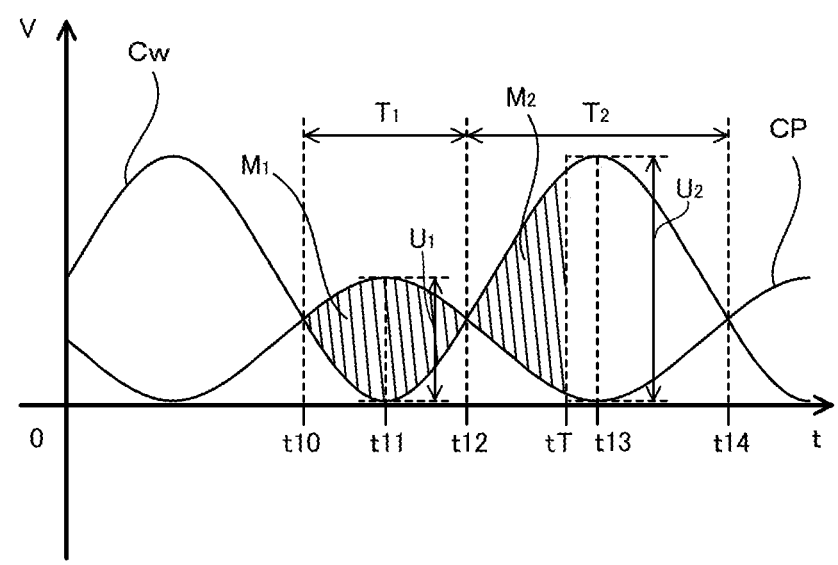
FIG. 6 is a graph illustrating an example of temporal changes in moving velocities that are instruction values in respective motion instruction data generated by the numerical control device of the third embodiment and used for motion of the workpiece and the machining tool.

FIG. 6 is a graph illustrating an example of temporal changes of respective motion instruction data used for motion of a workpiece and a machining tool generated by the numerical control device of the third embodiment. In FIG. 6, the horizontal axis represents time (t), and the vertical axis represents velocity (V). Further, FIG. 6 illustrates machining tool motion instruction data $C_P$ and workpiece motion instruction data $C_W$.

In the third embodiment, in the machining program analysis unit 110, the machining tool steady instruction component $A_P$, the machining tool variable instruction component $B_P$, the workpiece steady instruction component $A_W$, and the workpiece variable instruction component $B_W$ are acquired from a machining program downloaded by the numerical control device 100.

In the motion instruction generation unit 120, the machining tool steady instruction component $A_P$ and the machining tool variable instruction component $B_P$ acquired by the machining program analysis unit 110 are superimposed on each other, and thereby the machining tool motion instruction data $C_P$ is generated. Further, the workpiece steady instruction component $A_W$ and the workpiece variable instruction component $B_W$ are superimposed on each other, and thereby the workpiece motion instruction data $C_W$ is generated.

As illustrated in FIG. 5, the machining tool steady instruction component $A_P$ is expressed as a half line continuing at a predetermined value on the positive side in terms of velocity (V) of the vertical axis with respect to time (t) of the horizontal axis, as an example thereof. Further, the machining tool variable instruction component $B_P$ is expressed as a constantly periodical oscillation waveform having an amplitude of a predetermined value in terms of velocity (V) of the vertical axis, as an example thereof.

Further, the machining tool motion instruction data $C_P$ is generated by the machining tool steady instruction component $A_P$ and the machining tool variable instruction component $B_P$ being superimposed by the motion instruction generation unit 120 and is expressed as an oscillation waveform as illustrated in FIG. 6. In this case, since the amplitude value of the machining tool variable instruction component $B_P$ is set to be smaller than the amplitude value of the machining tool steady instruction component $A_P$, the machining tool motion instruction data $C_P$ resulted by these components being superimposed have positive instruction values of moving velocities at any time.

Similarly, the workpiece steady instruction component $A_W$ is expressed as a half line continuing at a predetermined value on the positive side in terms of velocity (V) of the vertical axis with respect to time (t) of the horizontal axis, as an example thereof. Further, the workpiece variable instruction component $B_W$ is expressed as a constantly periodical oscillation waveform having an amplitude of a predetermined value in terms of velocity (V) of the vertical axis, as an example thereof.

Further, the workpiece motion instruction data $C_W$ is generated by the workpiece steady instruction component $A_W$ and the workpiece variable instruction component $B_W$ being superimposed by the motion instruction generation unit 120 and is expressed as an oscillation waveform as illustrated in FIG. 6. In this case, since the amplitude value of the workpiece variable instruction component $B_W$ is set to be smaller than the amplitude value of the workpiece steady instruction component $A_W$, the workpiece motion instruction data $C_W$ resulted by these components being superimposed also have positive instruction values of moving velocities at any time.

Further, in the present embodiment, as an example thereof, the instruction values in the velocities of the machining tool steady instruction component $A_P$ and the workpiece steady instruction component $A_W$ have a relationship of $A_W > A_P$. Accordingly, as illustrated in FIG. 5, the workpiece steady instruction component $A_W$ is located and represented higher in the positive direction of velocity (V) than the machining tool steady instruction component $A_P$. Thus, without respective variable instructions being superimposed, the workpiece W will be moved steadily at a higher velocity than the machining tool P, that is, the machining tool P will be moved in a state where apparent cutting feed is always applied to the workpiece W.

Next, an example of a control operation of the relative positional relationship of a machining tool and a workpiece in accordance with motion instructions for the machining tool and the workpiece in the third embodiment will be described with reference to FIG. 6. As illustrated in FIG. 6, in the present embodiment, as an example thereof, the machining tool motion instruction data $C_P$ and the workpiece motion instruction data $C_W$ include the variable instruction components having a phase difference therebetween and are thus expressed in an alternatingly intersecting manner.

In FIG. 6, at the time when the workpiece motion instruction data $C_W$ intersects the machining tool motion instruction data $C_P$ (for example, time t10, t12, t14), the instruction values for velocities in the machining tool motion instruction data $C_P$ and the workpiece motion instruction data $C_W$ have a relationship of $C_W = C_P$. Therefore, since the workpiece motion instruction data $C_W$ and the machining tool motion instruction data $C_P$ at each time are the same, the relative positions of the machining tool P and the workpiece W do not change.

On the other hand, in FIG. 6, during a period $T_1$ in which the oscillation waveform of the machining tool motion instruction data $C_P$ is located higher in the positive direction of velocity (V) (that is, the upper side in FIG. 6) than the oscillation waveform of the workpiece motion instruction data $C_W$, the instruction values for velocities in the machining tool motion instruction data $C_P$ and the workpiece motion instruction data $C_W$ have a relationship of $C_P > C_W$. Accordingly, since the machining tool P has a higher moving velocity than the workpiece W, it can be understood that the machining tool P moves so as to apparently, gradually separate from the workpiece W during the period $T_1$.

Further, in FIG. 6, during a period $T_2$ in which the oscillation waveform of the workpiece motion instruction data $C_W$ is located higher in the positive direction of velocity (V) (that is, the upper side in FIG. 6) than the oscillation waveform of the machining tool motion instruction data $C_P$, the instruction values for velocities in the machining tool motion instruction data $C_P$ and the workpiece motion instruction data $C_W$ have a relationship of $C_W > C_P$. Accordingly, since the workpiece W has a higher moving velocity than the machining tool P, it can be understood that the machining tool P is moving so as to apparently, gradually approach the workpiece W (or such that cutting feed is being performed) during the period $T_2$.

Next, the state of the loads occurring in the machining tool P and the workpiece W during a period from time t10 to t14 will be described with reference to FIG. 6.

At time t10, the machining tool motion instruction data $C_P$ intersects the workpiece motion instruction data $C_W$, and the instruction values of both the data are the same. Thus, the relative difference in the moving velocity for the machining tool P and the workpiece W is zero, and the workpiece holder for fixing and moving the workpiece W and the machining tool holder for fixing and moving the machining tool P are in an unloaded state.

From time t10 to t12, the oscillation waveform of the machining tool motion instruction data $C_P$ is located higher in the positive direction of velocity (V) than the oscillation waveform of the workpiece motion instruction data $C_W$, and the machining tool P moves at a higher instruction velocity than the workpiece W. Accordingly, the machining tool P is in a positional relationship distant from the workpiece W, and the reaction force (load) applied to the machining tool P from the workpiece W is zero (unloaded state).

At time t12, as with the case of time t10, the machining tool motion instruction data $C_P$ intersects the workpiece motion instruction data $C_W$, and the instruction values of both the data are the same. Thus, the relative difference in the moving velocity for the machining tool P and the workpiece W is zero. Further, time t12 represents a state where the machining tool P is in a positional relationship that is apparently the most distant from the workpiece W, and the workpiece holder for fixing and moving the workpiece W and the machining tool holder for fixing and moving the machining tool P are still in an unloaded state.

From time t12 to t14, the oscillation waveform of the workpiece motion instruction data $C_W$ is located higher in the positive direction of velocity (V) than the oscillation waveform of the machining tool motion instruction data $C_P$, and the workpiece W moves at a higher instruction velocity than the machining tool P. Accordingly, the machining tool P moves so as to apparently, gradually approach the workpiece W, and, at transition time tT illustrated in FIG. 6, the machining tool P comes into contact with the workpiece W.

Herein, the time tT is set as a time when the area of a region $M_1$ and the area of a region $M_2$ match, as an example thereof, where the area of the region $M_1$ is the integral of the difference value between the oscillation waveform of the machining tool motion instruction data $C_P$ and the oscillation waveform of the workpiece motion instruction data $C_W$ for a period from time t10 to t12 illustrated in FIG. 6, and the area of the region M2 is the integral of the same for a period from time t12 to the transition time tT. The machining tool P then moves so as to apparently cut into the workpiece W on and after the transition time tT, and reaction force (load) from the workpiece W occurs on the machining tool P.

Further, at time t13, the difference $U_1$ between the instruction value in the workpiece motion instruction data $C_W$ and the instruction value in the machining tool motion instruction data $C_P$ is largest, and therefore, the machining tool P moves at the slowest instruction value relative to the workpiece W, which means that the instruction value for apparent cutting feed (that is, the apparent cutting depth) is largest. Thus, the reaction force (load) from the workpiece W is also largest on the machining tool P.

At time t14, as with the case of time t10, the machining tool motion instruction data $C_P$ intersects the workpiece motion instruction data $C_W$, and the relative difference in the moving velocity for the machining tool P and the workpiece W is zero. At this time, the workpiece holder for fixing and moving the workpiece W and the machining tool holder for fixing and moving the machining tool P are in an unloaded state.

In such a way, the machining tool motion instruction data $C_P$ and the workpiece motion instruction data $C_W$ are provided as constantly periodical oscillation waveforms, and thereby the operation to control the positional relationship between the machining tool P and the workpiece W from time t10 to t14 illustrated in FIG. 6 is periodically, repeatedly performed.

Figure 7:
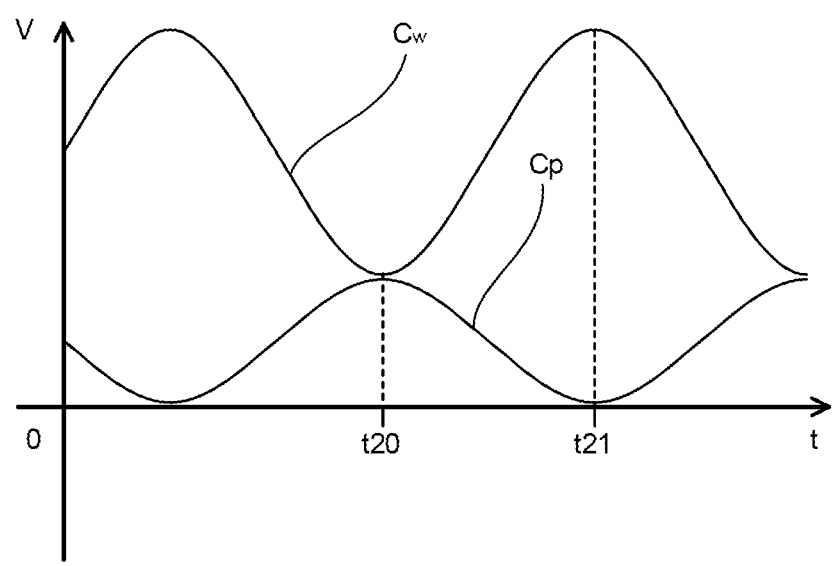
FIG. 7 is a graph illustrating an example of temporal changes in motion instruction data used for motion of the workpiece and the machining tool according to a modified example of the third embodiment.

FIG. 7 is a graph illustrating an example of temporal changes of motion instruction data used for motion of a workpiece and a machining tool according to a modified example of the third embodiment of the present invention. As illustrated in FIG. 7, in this modified example, the oscillation waveform of the workpiece motion instruction data $C_W$ is located higher in the positive direction of velocity (V) (that is, the upper side in FIG. 7) at any time than the oscillation waveform of the machining tool motion instruction data $C_P$.

In such a case, there is no period in which the oscillation waveform of the workpiece motion instruction data $C_W$ matches or intersects the oscillation waveform of the machining tool motion instruction data $C_P$ as illustrated in FIG. 6, which means that the workpiece W always moves based on a larger instruction value (that is, a higher instruction velocity) than the machining tool P. Therefore, the machining tool P moved based on the motion instruction as illustrated in FIG. 7 is controlled in a state where the cutting depth to the workpiece W is changed and cutting feed is always applied thereto.

In this state, at time t20, the difference between the instruction value of the workpiece motion instruction data $C_W$ and the instruction value of the machining tool motion instruction data $C_P$ is smallest, and this is a state where the relative velocity difference therebetween is smallest, that is, a state where the load applied to the machining tool P from the workpiece W is smallest. In contrast, at time t21, the difference between the instruction value of the workpiece motion instruction data $C_W$ and the instruction value of the machining tool motion instruction data $C_P$ is largest, and this is a state where the relative velocity difference therebetween is largest, that is, a state where the load applied to the machining tool P from the workpiece W is largest. In such a way, by adjusting the positional relationship between the oscillation waveform of the workpiece motion instruction data $C_W$ and the oscillation waveform of the machining tool motion instruction data $C_P$, it is possible to adjust the load applied to the machining tool P from the workpiece W.

As described above, in the numerical control device according to the third embodiment of the present invention, by setting the variable instructions in the motion instructions for a machining tool and a workpiece to instructions expressed by periodical oscillation waveforms having the same cycle, it is possible to easily control the relative positional relationship between the machining tool and the workpiece in accordance with what positional relationship the waveforms of motion instructions for both the machining tool and the workpiece have, which is achieved in addition to the advantageous effects obtained in the first and second embodiments. Further, as a result of controlling the relative positional relationship between the machining tool and the workpiece, it is possible to also control the load applied to the machining tool P from the workpiece W.

Note that, although the case where the phase difference between respective variable instructions for the machining tool P and the workpiece P is 180 degrees has been illustrated as an example in the specific examples illustrated in FIG. 5 to FIG. 7, this phase difference can be set at any degree in the present invention. Specifically, it is preferable that the phase difference described above be 120 degrees to 240 degrees, and the case of 180 degrees as depicted is the most effective and preferable.

Further, although the case where the amplitude values of the variable instructions described above are constant has been illustrated as an example in the specific examples illustrated in FIG. 5 to FIG. 7, the amplitude values of the variable instructions in both the motion instructions may be changed during control, that is, during machining as long as these variable instructions have the same cycle. Accordingly, it is possible to adjust the apparent positional relationship between the machining tool P and the workpiece W in any manner in a particular period.

Note that the present invention is not limited to the embodiments described above and can be suitably changed within the scope not departing from the spirit thereof. In the present invention, modification of any feature of the embodiments or omission of any feature of the embodiments is possible within the scope of the invention.

LIST OF REFERENCE SYMBOLS 10 machine tool
12 machining tool stage
14 workpiece stage
20 external storage device
100 numerical control device
110 machining program analysis unit
120 motion instruction generation unit
130 interpolation unit
132 first interpolation unit
134 second interpolation unit
$A_P$ machining tool steady instruction component
$A_W$ workpiece steady instruction component
$B_P$ machining tool variable instruction component
$B_W$ workpiece variable instruction component
$C_1$, $C_2$ chip
$C_P$ machining tool motion instruction data
$C_W$ workpiece motion instruction data
$D_1$ machining tool moving direction
$D_2$ workpiece moving direction
$D_{P1}$ to $D_{P4}$ machining tool moving distance
$D_{W1}$ to $D_{W4}$ workpiece moving distance
$E_1$ to $E_4$ reaction force
$F_{P0}$ to $F_{P4}$ machining tool projection face
$F_{W0}$ to $F_{W4}$ workpiece projection face
L, $L_1$, $L_2$ length
P machining tool
$R_1$ to $R_4$ relative moving direction
$R_d$ relative distance
$S_{P0}$ to $S_{P4}$ machining tool position
$S_{W0}$ to $S_{W4}$ workpiece position
$T_1$, $T_2$ interval
$U_1$, $U_2$ relative velocity difference
W workpiece

The invention claimed is:

1. A numerical control device used for a machine tool and configured to move a machining tool and a workpiece in the same direction on parallel respective drive shafts based on a machining program and control a relative positional relationship between the machining tool and the workpiece during the motion in the same direction,
    wherein at least one of motion instructions for the machining tool and the workpiece is an instruction whose instruction value varies arbitrarily with time elapsed,
    the numerical control device when executing the machining program is caused to:
        acquire the motion instructions for the machining tool and the workpiece from the machining program;
        generate machining tool motion instruction data on the machining tool and workpiece motion instruction data on the workpiece based on the motion instructions; and
        generate machining tool interpolation data based on the machining tool motion instruction data and generate workpiece interpolation data based on the workpiece motion instruction data.

2. The numerical control device according to claim 1, wherein at least one of the machining tool motion instruction data and the workpiece motion instruction data includes an operation such that the machining tool and the workpiece are separated from each other at least once during the motion in the same direction.

3. The numerical control device according to claim 1, wherein a motion instruction for the machining tool is a motion instruction in which a steady instruction and a variable instruction for the machining tool acquired from the machining program are superimposed, and a motion instruction for the workpiece is a motion instruction in which a steady instruction and a variable instruction for the workpiece acquired from the machining program are superimposed.

4. The numerical control device according to claim 3, wherein the variable instruction in the machining program has a constantly periodical oscillation waveform,
    wherein in the machining tool motion instruction data, an amplitude value of the variable instruction is always smaller than that of the steady instruction with respect to time change,
    wherein in the workpiece motion instruction data, an amplitude value of the variable instruction is always smaller than that of the steady instruction with respect to time change, and wherein one of the variable instruction of the machining tool motion instruction data and the variable instruction of the workpiece motion instruction data has a phase difference from the other.

5. The numerical control device according to claim 4, wherein at least one of the variable instruction of the machining tool motion instruction data and the variable instruction of the workpiece motion instruction data is adjusted so that the phase difference between the variable instruction of the machining tool motion instruction data and the variable instruction of the workpiece motion instruction data is 120 degrees to 240 degrees.

6. The numerical control device according to claim 5, wherein at least one of the variable instruction of the machining tool motion instruction data and the variable instruction of the workpiece motion instruction data is adjusted so that the phase difference between the variable instruction of the machining tool motion instruction data and the variable instruction of the workpiece motion instruction data is 180 degrees.

7. The numerical control device according to claim 4, wherein respective amplitude values of the variable instruction of the machining tool motion instruction data and the variable instruction of the workpiece motion instruction data are changed during machining.

\* \* \* \* \*